United States Patent [19]

Hallas et al.

[11] 3,855,203

[45] Dec. 17, 1974

[54] 4''-O-SULFONYL ERYTHROMYCIN-9-O-OXIME DERIVATIVES

[75] Inventors: Robert Hallas, Waukegan; John Soloman Tadanier, Chicago; Anne Mary Von Esch, North Chicago, all of Ill.

[73] Assignee: Abbott Laboratories, Chicago, Ill.

[22] Filed: May 3, 1973

[21] Appl. No.: 356,987

[52] U.S. Cl. .............................. 260/210 E, 424/181
[51] Int. Cl. ......................................... C07c 129/18
[58] Field of Search ................................ 260/210 E

[56] References Cited
UNITED STATES PATENTS

| | | | |
|---|---|---|---|
| 3,574,185 | 4/1971 | Von Esch | 260/210 E |
| 3,681,326 | 9/1972 | Tamburaser et al. | 260/210 E |
| 3,736,313 | 5/1973 | Jones & Perun | 260/210 E |

*Primary Examiner*—Lewis Gotts
*Assistant Examiner*—Cary B. Owens
*Attorney, Agent, or Firm*—Robert L. Niblack; James L. Bailey; Vincent A. Mallare

[57] ABSTRACT

Covers 4''-O-sulfonyl erythromycin-9-O-oxime derivatives falling within the following structural formula:

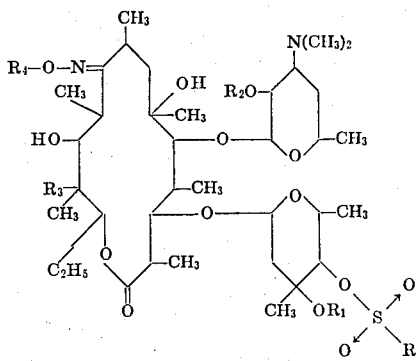

where R is selected from the group consisting of loweralkyl, loweralkenyl, aryl, substituted aryl, benzyl and substituted benzyl, $R_1$ is hydrogen or methyl, $R_2$ is hydrogen or loweralkanoyl, $R_3$ is hydrogen or hydroxyl, and $R_4$ is selected from the group consisting of loweralkyl, cycloalkyl, substituted cycloalkyl, aryl, substituted aryl, benzyl and substituted benzyl. These 9-O-oxime derivative compounds are useful as antibiotics.

4 Claims, No Drawings

4''-O-SULFONYL ERYTHROMYCIN-9-O-OXIME DERIVATIVES

DESCRIPTION OF THE INVENTION

This invention relates to derivatives of erythromycin A, B and C, and more particularly to 4''-O-sulfonyl erythromycin-9-O-oxime derivatives. The new compounds of this invention have the following structural formula:

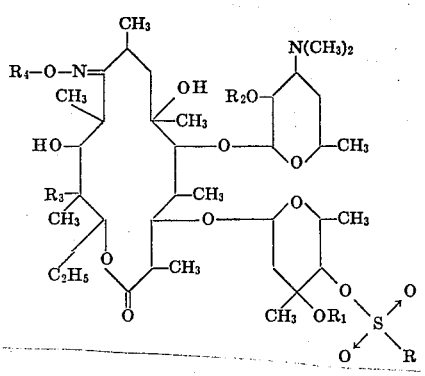

where R is selected from the group consisting of loweralkyl, loweralkenyl, aryl, substituted aryl, benzyl and substituted benzyl, $R_1$ is hydrogen or methyl, $R_2$ is hydrogen or loweralkanoyl, $R_3$ is hydrogen or hydroxyl, and $R_4$ is selected from the group consisting of loweralkyl, cycloalkyl, substituted cycloalkyl, aryl, substituted aryl, benzyl and substituted benzyl.

Erythromycin is produced in three forms denoted A, B and C by cultivating a strain of *Streptomyces erythreus* in a suitable nutrient medium as is taught in U.S. Pat. No. 2,653,899, Bunch, et al. The structure of erythromycin is represented by the following formula:

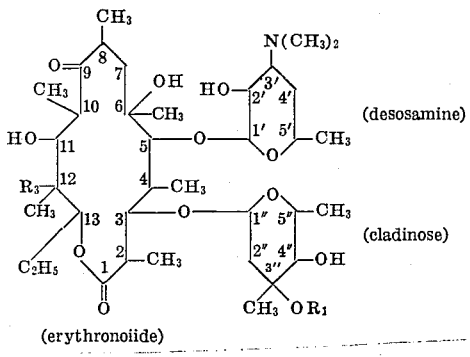

(erythronolide)

In this formula, when $R_1$ is methyl and $R_3$ is hydroxyl, the structure illustrated is erythromycin A. When $R_1$ is methyl and $R_3$ is hydrogen, the structure of erythromycin B is illustrated. When $R_1$ is hydrogen and $R_3$ is hydroxyl, the structure of erythromycin C is illustrated. The term "erythromycin" when used herein without modification is meant to embrace all three forms, that is, erythromycin A, B and C.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers, while positions on the erythronolide ring are indicated by unprimed numbers.

The compounds here may be prepared by a wide variety of methods. However, the most convenient method is to first provide a 9-O-oxime derivative of erythromycin or a 2' alkanoyl erythromycin-9-O-oxime derivative. Typical derivatives of this type may be prepared according to the procedures outlined in U.S. Pat. No. 3,681,326. The erythromycin compound is then reacted with a sulfonyl chloride having the formula $RSO_2Cl$ wherein R is a group as defined above. The reaction is best carried out in a suitable inert solvent such as pyridine. Preferably, the sulfonyl chloride is slowly added in dropwise fashion to a solution of the erythromycin. Also it is usually desirable that some means such as an ice bath is employed to keep the temperature of the reaction mixture around about 0° C. The reaction mixture is then gently agitated until reaction is complete, ususally ¼ to 1 hour.

If one starts a 2'-O-alkanoyl erythromycin oxime and reacts it with the sulfonyl chloride, the product may, if desired, be de-esterified at the 2'-position through hydrolysis or alcoholysis. For example, this can be accomplished by adding the product to a solution of methanol and aqueous 5% $NaHCO_3$, and carrying out the reaction with agitation for about 24 hours. The methanol can then be removed under reduced pressure, and the product extracted with a suitable solvent such as chloroform.

The following examples more clearly illustrate the invention:

EXAMPLE I

4''-O-Methanesulfonyl Erythromycin A-9-O-Methyloxime

To a cooling solution of 7.62 g. (0.01 M.) of erythromycin A-9-O-methyloxime in 250 ml. of pyridine was added 8 ml. of methanesulfonyl chloride slowly and dropwise over a 15-minute period. After this addition, the reaction mixture was stirred in the ice bath for an additional 45 minutes. This mixture was then poured into 1 liter of 5% $NaHCO_3$ solution and extracted with 2 × 600 ml. of benzene. The benzene extracts were combined and washed again with 500 ml. of 5% $NaHCO_3$ solution. The layers were separated and the organic layer was dried over $MgSO_4$, filtered and concentrated to leave a glass with the odor of residual pyridine. This odor was removed by azeotroping several times with benzene. This left 7.60 g. of desired product. This material was purified by column chromatography to yield pure product. Analysis of the compound on C, H and N confirmed it to be the desired product as follows: $C_{39}H_{72}N_2O_{15}S$; M.W. — 841.05

Analysis: Theory: C: 55.69, H: 8.63, N: 3.33
Found: C: 55.17, H: 8.73, N: 3.13

EXAMPLE II

4''-O-Methanesulfonyl Erythromycin B-9-O-Methyloxime

This product was prepared according to the procedure of Example I. From 3.74 g. (5.00 mM.) erythromycin B-9-O-methyloxime was obtained 3.68 g. of desired product. Of this material 1.36 g. was purified by column chromatography to obtain 760 mg. of pure material. Analysis on this compound for C, H and N agreed with the desired product as follows: $C_{39}H_{72}N_2O_{14}S$; M.W. — 825.05

Analysis:  Theory: C: 56.77, H: 8.80, N: 3.40
           Found  C: 57.09, H: 8.90, N: 3.47

EXAMPLE III

4''-O-Vinylsulfonyl Erythromycin A-9-O-Methyloxime

This product was prepared in the same manner as the compound of Example I. From 12.0 g. (0.0158 M.) erythromycin A-9-O-methyloxime and 5.2 ml. of 2-bromoethanesulfonyl chloride was obtained 8.65 g. of desired product of this material, 3.0 g. was removed and purified by column chromatography to obtain a purified product. Analysis on this commpound for C, H and N agreed with the desired product.

EXAMPLE IV

4''-O-Vinylsulfonyl Erythromycin B-9-O-Methyloxime

This product was prepared in the same manner as outlined in Example I. From 14.90 g. (0.02 M.) erythromycin B-9-O-methyloxime and 6.2 ml. of 2-bromoethanesulfonyl chloride was obtained 16.70 g. of desired product. Of this material, 3.0 g. was purified by column chromatography to obtain the purified product. Analysis on this compound for C, H and N agreed with the desired product.

EXAMPLE V

4''-O-p-Nitrobenzenesulfonyl Erthromycin A-9-O-Methyloxime

To a cooling solution of 3.82 g. (5.00 mM.) of erythromycin A-9-O-methyloxime dissolved in 50 ml. of pyridine, 3.33 g. (0.015 M.) of p-nitrobenzenesulfonyl chloride was added in one portion. After several minutes of hand stirring, all of the sulfonyl chloride had dissolved. The solution was then allowed to stand in the ice bath for an additional 15 minutes. After this period of time, the solution was removed from the ice bath and allowed to stand at room temperature for seven days. Thereafter, the solution was poured into 500 ml. of 5% $NaHCO_3$ solution, and extracted with 2 × 300 ml. portions of chloroform. The extracts were combined and washed with another 300 ml. of 5% $NaHCO_3$ solution. The layers were separated, and the organic layer was dried over $MgSO_4$, filtered and concentrated to leave 4.55 g. of desired product. This material was purified by column chromatography to obtain an analytically pure sample. The analysis was as follows: $C_{44}H_{73}N_3O_{17}S$; M.W. — 948.09

Analysis:  Theory: C: 55.74; H: 7.76, N: 4.43
           Found: C: 55.59, H: 7.94, N: 4.15

EXAMPLE VI

4''-O-p-Nitrobenzenesulfonyl Erythromycin B-9-O-Methyloxime

This material was prepared as described in Example V. From 3.73 g. (5.00 mM) of erythromycin B-9-O-methyloxime was obtained 4.50 g. of desired product. This material was purified by column chromatography to obtain an analytically pure sample. The analysis agreed with the desired product.

EXAMPLE VII

4''-O-Benzylsulfonyl Erythromycin A-9-O-Methyloxime

This material was prepared as described in Example I with the exception that benzylsulfonyl chloride was employed as a reactant. From 3.82 g. (5.00 mM.) of erythromycin A-9-O-methyloxime was obtained 4.26 g. of desired product. This material was purified by recrystallization from isopropyl alcohol — M.P. 160° – 163° C. The analysis agreed with the desired product.

EXAMPLE VIII

4''-O-Benzylsulfonyl Erythromycin B-9-O-Methyloxime

This material was prepared as described in Example VII. From 3.73 g. (5.00 mM.) of erythromycin B-9-O-methyloxime was obtained 4.41 g. of desired product. This material was purified by column chromatography to obtain an analytically pure sample. The analysis agreed with the desired product.

Other erythromycin derivatives falling within the scope of the invention may be prepared by, for example, varying the particular sulfonyl chloride used by varying the R group in said sulfonyl chloride. Generally when R is alkyl it is a loweralkyl $C_{1-4}$ branched or straight chain. Likewise R may be any loweralkenyl group other than vinyl, generally $C_{1-4}$ branched or straight chain alkenyl. When R is substituted aryl the substituent on the benzene ring may be nitro, halo, alkyl, etc. The same substituents may be present when benzyl is substituted in the aromatic ring. Likewise, instead of erythromycin A or B, erythromycin C may be substituted as a reactant. Lastly when the erythromycin reactant has its 2'-position substituted as alkanoyl, the $R_2$ group is usually a lower $C_{1-4}$ branched or straight chain alkanoyl.

Representative erythromycin derivatives here were tested for their antibiotic activity both in vivo and in vitro. To test the compounds in vivo mice were injected with *Staphylococcus aureaus* Smith and various dosages of the antibiotic administered to treat the infection. All infected mice which were not treated died, whereas varying percentages of mice also treated with antibiotic survived as shown below.

The compounds were also tested in vitro against a variety of gram negative and gram positive bacteria. Figures given below are MIC values in terms of mcg./ml.

A wide variety of organisms were used to test the in vitro activity of the compounds here. These are as follows:

1. *Staphylococcus aureus* 9144
2. *Staphylococcus aureus* Smith
3. *Staphylococcus aureus* Smith ER
4. *Staphylococcus aureus* Quinones
5. *Staphylococcus aureus* Wise 155
6. *Streptococcus faecalis* 10541
7. *Escherichia coli* Juhl
8. *Klebsiella pneumoniae* 10031
9. *Proteus vulgaris* Abbott JJ
10. *Proteus mirabilis* Finland No. 9
11. *Salmonella typhimurium* Ed No. 9
12. *Shigella sonnei* 9290
13. *Pseudomonas aeruginosa* BMH No. 10
14. *Streptococcus pyogenes* Roper
15. *Streptococcus pyogenes* Scott
16. *Haemophilus influenzae* 9334

17. *Haemophilus influenzae* Brimm CSF
18. *Haemophilus influenzae* Illinois
19. *Haemophilus influenzae* Patterson
20. *Haemophilus influenae* influenzae
21. *Haemophilus influenzae* Terry
22. *Myco. gallisepticum* S6
23. *Myco. granularum* 19168
24. *Myco. hyorhinis* 17981
25. *Myco. pneumoniae* FH
26. *Trichomonas vaginalis* C1M1
27. *Crithidia fasciculata*
28. *Staphylococcus aureus* 209P ER
29. *Staphylococcus aureus* MIH No. 7
30. *Staphylococcus aureus* Wise J. 66
31. *Staphylococcus aureus* Wise J. 348
32. *Staphylococcus aureus* Wise J. 419
33. *Staphylococcus aureus* Wise J. 645
34. *Diplococcus pneumoniae* Dixon 23

Results of in vivo testing are as follows. All antibiotic compounds of the invention were administered orally.

TABLE I

| Example No. | Dosage mg./kg. — Percent Survival | | | |
|---|---|---|---|---|
|   | 300 | 150 | 75 | 37.5 |
| I | 100 | 100 | 60 | 0 |
| II | 60 | 50 | 0 | — |

In vitro results are as follows:

TABLE II - EXAMPLE I

| Organism No. | MIC |
|---|---|
| 1 | .78 |
| 2 | .78 |
| 3 | >100 |
| 4 | 25 |
| 5 | 50 |
| 6 | .10 |
| 7 | >100 |
| 8 | 12.5 |
| 9 | >100 |
| 10 | >100 |
| 11 | 50 |
| 12 | 100 |
| 13 | 100 |
| 14 | >100 |
| 15 | >100 |
| 16 | 25 |
| 17 | 12.5 |
| 18 | 12.5 |
| 19 | 25 |
| 20 | 12.5 |
| 21 | 12.5 |
| 22 | .05 |
| 23 | .50 |
| 24 | 25 |
| 25 | .05 |
| 26 | >100 |
| 27 | >100 |

TABLE III - EXAMPLE II

| Organism No. | MIC |
|---|---|
| 1 | 1.56 |
| 2 | 1.56 |
| 3 | >100 |
| 4 | >100 |
| 5 | >100 |
| 6 | .78 |
| 7 | >100 |
| 8 | 25 |
| 9 | >100 |
| 10 | >100 |
| 11 | 100 |
| 12 | 100 |
| 13 | 100 |
| 14 | >100 |
| 15 | >100 |
| 16 | 100 |
| 17 | 25 |

TABLE III - EXAMPLE II-Continued

| Organism No. | MIC |
|---|---|
| 18 | 25 |
| 19 | 25 |
| 20 | 25 |
| 21 | 25 |
| 22 | .02 |
| 23 | .5 |
| 24 | 25 |
| 25 | .10 |
| 26 | >100 |
| 27 | >100 |

The compounds of the invention here are useful as antibiotics when administered to warm-blooded animals at a preferred dosage of 25 – 2,000 mg./kg. of body weight daily to treat infections in which one of the above or another susceptible bacterial organisms is the causative agent. More often the dosage is 75 – 1,000 mg./kg.

Although administration is possible by the intraperitoneal route wherein the dose is dissolved or suspended in an inert physiologically harmless agent such as aqueous tragacanth, the preferred route is oral, either in capsule or tablet form. Capsules can, in addition to the active erythromycin also contain inert fillers such as lactose.

Tablets are made in the usual manner on tableting presses, and although the active compounds may be tableted alone, it is preferred that a release agent such as magnesium stearate to aid in freeing the tablets from the machine dies during manufacture, together with a binder such as starch to assure good particle cohesion are included in a blend of active ingredient and diluents prior to tableting. After tableting, the tablets can be coated if desired. A preferred blend for tableting is as follows:

|   | Percent |
|---|---|
| Erythromycin Compound | 77 |
| Magnesium stearate | 2 |
| Starch powder | 21 |

We claim:

1. A 4''-O-sulfonyl erythromycin-9-O-oxime derivative of the following structural formula:

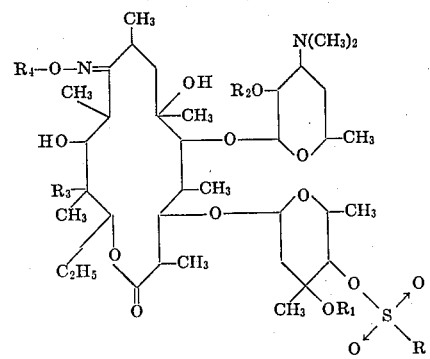

where R is selected from the group consisting of loweralkyl or loweralkenyl, $R_1$ is hydrogen or methyl, $R_2$ is hydrogen or loweralkanoyl, $R_3$ is hydrogen or hydroxyl, and $R_4$ is selected from the group consisting of loweralkyl or lower cycloalkyl.

2. A 4''-O-sulfonyl erythromycin-9-O-oxime derivative of the following structural formula:

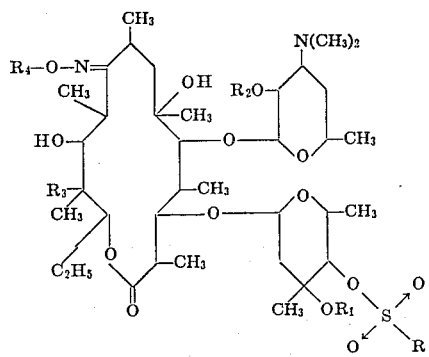
wherein R and $R_1$ are methyl, $R_2$ and $R_3$ are hydrogen, and $R_4$ is methyl.
3. The derivative of claim 2 wherein R and $R_1$ are methyl, $R_2$ is hydrogen, $R_3$ is hydroxy, and $R_4$ is methyl.
4. The derivative of claim 2 wherein R is vinyl, $R_1$ is methyl, $R_2$ and $R_3$ are hydrogen, and $R_4$ is methyl.
* * * * *

UNITED STATES PATENT AND TRADEMARK OFFICE
CERTIFICATE OF CORRECTION

PATENT NO. : 3,855,203
DATED : December 17, 1974
INVENTOR(S) : Robert Hallas, John Soloman Tadanier, Anne Mary Von Esch It is certified that error appears in the above-identified patent and that said Letters Patent are hereby corrected as shown below:

Column 5, line 4:

After "20. Haemophilus" delete "influenae influenzae" and substitute therefor --influenzae Shemwell--

Signed and Sealed this twenty-fifth Day of November 1975

[SEAL]

Attest:

RUTH C. MASON
Attesting Officer

C. MARSHALL DANN
Commissioner of Patents and Trademarks